US00RE36282E

United States Patent [19]

Nitschke

[11] E Patent Number: Re. 36,282

[45] Reissued Date of Patent: Aug. 31, 1999

[54] SYSTEM FOR USING GEOPRESSURED-GEOTHERMAL RESERVOIRS

[76] Inventor: George S. Nitschke, 10835 SE. 200, #A6, Kent, Wash. 98031

[21] Appl. No.: 08/344,228

[22] Filed: Nov. 23, 1994

Related U.S. Patent Documents

Reissue of:

[64] Patent No.: 5,165,235
Issued: Nov. 24, 1992
Appl. No.: 07/628,839
Filed: Dec. 12, 1990

[51] Int. Cl.[6] ..... F03G 7/00

[52] U.S. Cl. ..... 60/641.2

[58] Field of Search ..... 60/641.2, 641.3, 60/641.4, 641.5; 203/DIG. 20

[56] References Cited

U.S. PATENT DOCUMENTS

| | | | |
|---|---|---|---|
| 2,927,428 | 3/1960 | Sala | 60/40 |
| 3,470,943 | 10/1969 | Van Huisen | 165/45 |
| 3,845,627 | 11/1974 | Hutchinson | 60/641 |
| 3,893,299 | 7/1975 | Hutchinson et al. | 60/641 |
| 3,953,972 | 5/1976 | Awerbuch et al. | 60/641 |
| 3,988,895 | 11/1976 | Sheinbaum | 60/641 |
| 4,026,111 | 5/1977 | Matthews | 60/641 |
| 4,054,175 | 10/1977 | Swearingen | 60/641.2 |
| 4,060,988 | 12/1977 | Arnold | 60/641 |
| 4,132,075 | 1/1979 | Fleck et al. | 60/641 |
| 4,152,898 | 5/1979 | Awerbuch | 60/641 |
| 4,211,613 | 7/1980 | Meckler | 203/11 |
| 4,429,535 | 2/1984 | Featherstone | 60/641.2 |
| 4,665,705 | 5/1987 | Bonham, Jr. | 60/641.2 |
| 4,719,759 | 1/1988 | Zaslavsky | 60/641.8 |
| 4,824,447 | 4/1989 | Goldsberg . | |
| 5,165,235 | 11/1992 | Nitschke | 60/641.2 |

OTHER PUBLICATIONS

Dorfman, Myron H., "Geopressured–Geothermal Energy And Associated Natural Gas," Proceedings, Eleventh Annual Energy Source Conference and Exhibit, 1988, pp. 97–101.

Riney, T.D., "Gladys McCall Geopressured Reservoir Analysis," Proceedings, ASME Eleventh Annual Energy Source Conference and Exhibit, 1988, pp. 153–160.

Chacko, J. John, "Geology Of The Gladys McCall Geopressured–Geothermal Prospect, Cameron Parish, Louisiana," Proceedings, ASME Eleventh Annual Energy Source Conference and Exhibit, 1988, pp. 115–121.

Azari, M., "Average Aquifer Pressure And Reserve Estimates In Geopressured–Geothermal Reservoirs," Proceedings, ASME Eleventh Annual Energy Source Conference and Exhibit, 1988, pp. 81–87.

Street, J., E.H., and Tomson, M.B., "Scale Inhibition During Coproduction of Natural Gas," Proceedings, SPE Gas Technology Symposium, 1988, pp. 161–170.

(List continued on next page.)

*Primary Examiner*—Ira S. Lazarus
*Assistant Examiner*—Alfred Basichas
*Attorney, Agent, or Firm*—Vance, Romero & Montague, P.S.

[57] ABSTRACT

Process of drilling a bore into a geopressured-geothermal reservoir containing a gas-laden fluid, allowing the fluid to escape through the bore, passing the fluid into a rotatable turbine which causes a generator to produce electricity, passing the fluid to means for separating gas from the fluid, and passing the fluid into a multi-effect distillation system to extract fresh water from the fluid to produce fresh water and saturated brine.

11 Claims, 9 Drawing Sheets

OTHER PUBLICATIONS

Cuddihee, J.L.; O'Day, P.; Salimi, M.H.; Street, E.H.; Tomson, M.B.; "Prevention of $CaCO_3$ Scale By Downhole Inhibitor Squeezes In Gulf Coast Wells," Proceedings, ASME Eleventh Annual Energy Source Conference and Exhibit, 1988, p. 95.

Klementich, Erich F., and Jellison, Michael J., "Tubing String Design Considerations For Geopressured–Geothermal Wells," Proceedings, ASME Eleventh Annual Energy Source Conference and Exhibit, 1988, pp. 123–137.

Meahl, T.E., "Utilization of Geopressured–Geothermal Energy For Enhancement Of Secondary Oil Recovery," Proceedings, ASME Eleventh Annual Energy Source Conference and Exhibit, 1988, pp. 139–142.

Biljetina, Richard, and Campbell, Richard G., "Surface Production Equipment And Electrical Generation Systems For The Pleasant Bayou Geopressured–Geothermal Well System Brazoria County, Texas," Proceedings, ASME Eleventh Annual Energy Source Conference and Exhibit, 1988, pp. 89–93.

Van Sickle, V.R.; Trahan, D.B.; and Stevenson, D.A., "Environmental Effects of Large–Scale Geopressured–Geothermal Resource Testing," Proceedings, ASME Eleventh Annual Energy Source Conference and Exhibit, 1988, pp. 161–169.

Eaton, B.A.; Featherston, C.R.; Meahl, T.E.; "U.S. Gulf Coast DOE Geopressured–Geothermal Energy Program Field Research Site Operations FY 1986 To Present Accomplishments and Goals," Proceedings, ASME Eleventh Annual Energy Source Conference and Exhibit, 1988, pp. 103–108.

Ramsthaler, Jack, and Plum, Martin, "Future For Geopressured–Geothermal Resources," Proceedings, ASME Eleventh Annual Energy Source Conference and Exhibit, 1988, pp. 145–152.

Tabor, H., "Solar Ponds As Heat Source For Low–Temperature Multi–Effect Distillation Plants," *Desalination*, vol. 17, 1975, pp. 289–302.

Rubin, Hillel, and Bemporad, Giorgio A., "The Advanced Solar Pond (ASP): Basic Theoretical Aspects," *Solar Energy*, vol. 43, No. 1, pp. 35–44, 1989.

Swift, Andrew, and Reid, Robert, Electricity And Desalinated Water, *SunWorld*, vol. 11, No. 3, pp. 73–74, 95, 1987.

Jones, G.F.; Meyer, K.A.; Hedstrom, J.C.; Dreicer, J.S.; Grimmer, D.P.; "Design, Construction, And Initial Operation Of The Los Alamos National Laboratory Salt–Gradient Solar Pond," ASME Solar Energy Division Meeting, Orlando, Florida, Apr. 1983.

Tleimat, B.W., and Howe, E.D., "Comparative Productivity of Distillation and Reverse Osmosis Desalination Using Energy from Solar Ponds," *Journal of Solar Energy Engineering*, Transactions of the ASME, vol. 104, pp. 299–304, Nov. 1982.

Tleimat, Maher C., and Howe, Everett D., "The Use Of Energy From Salt–Gradient Solar Ponds For Reclamation Of Agricultural Drainage Water In California: Analysis And Cost Prediction," *Solar Energy*, vol. 42, No. 4, pp. 339–349, 1989.

Morin, O.J.; Hornburg, C.D.; Hart, G.K.; "A Preliminary Investigation Of The Applicability Of Combining The MED And SWRO Processes For Seawater Desalination," *Water Supply Improvement Association Journal*, pp. 19–28, 1982.

Chandler, Philip B., "A Southern California Potential For Coastal Zone Geothermal Desalination," *Water Supply Improvement Association Journal*, pp. 25–33, 1982.

Raleigh, C.B.; Healy, J.H.; Bredehoeft, J.D.; "An Experiment in Earthquake Control at Rangely, Colorado," *Science*, vol. 191, pp. 1230–1237, Mar. 1976.

Segall, P., "Earthquakes triggered by fluid extraction", *Geology*, vol. 17, pp. 942–946, Oct. 1989.

Wetmiller, Robert J., "Earthquakes near Rocky Mountain House, Alberta, and their relationship to gas production facilities," *Canadian Journal of Earth Sciences*, vol. 23, pp. 172–181, 1986.

Glueckstern, P., "A Water Utility's Experience Regarding The Reliability And Operating Costs Of Various Desalination Technologies Over The Past Decade," *Water Supply Improvement Association Journal*, 1982.

"Drought Contingency Planning Guidelines for 1989," State of California, The Resources Agency, Department of Water Resources, Jan. 1989.

Cameron, Mindy, "Californians Won't Face Watery Truth"; Cameron, Mindy; Seattle Times, May 27, 1990.

Wallace, Jr., R.H.; Kraemer, T.F.; Taylor, R.E.; and Wesselman, J.B.; "Assessment of Geopressured–Geothermal Resources in the Northern Gulf of Mexico Basin," Assessment of Geothermal Resources of the United States, 1978, *Geological Survey Circular* 790, pp. 132–155.

Csanady, G.T., "Theory of Turbomachines," McGraw–Hill, New York, 1964.

Thurston, G.C.; Bliem, C.J.; and Plum, M.M.; "The Feasiblity Of Hydraulic Recovery From Geopressured–Geothermal Resources," Proceedings, Industrial Consortium for the Utilization of the Geopressured–Geothermal Resource, Austin, 1990, vol. 2, Feb. 1991, pp. 115–152.

Ikoku, Chi. U., "Natural Gas Production Engineering," Wiley, New York, 1984, Ch. 4.3.

Negus–de Wys, J.; Hart, G.F.; Kimmell, C.E.; and Plum, M.M.; "The Feasibility Of Recovering Medium To Heavy Oil Using Geopressured–Geothermal Fluids," Proceedings, Industrial Consortium for the Utilization of the Geopressured–Geothermal Resource, Austin, 1990, vol. 2, Feb. 1991, pp. 1–92.

Lunis, B.D.; Negus–de Wys, J.; Plum, M.M.; Lienau, P.J.; Spencer, F.J.; and Nitschke, G.S.; "Applying Geopressured–Geothermal Resources To Direct Uses Is Feasible," Proceedings, Industrial Consortium for the Utilization of the Geopressured–Geothermal Resource, Austin, 1990, vol. 1, Feb. 1991, pp. 83–138.

Savage, S.B., "Solar Pond", *Solar Energy Engineering*, Academic Press, 1977.

Thrash, P.J.; Brown, K.E.; Field Operation Handbook For Gas Lift, Otis Engineering Corp.

"Water And Power From Geothermal Resources: Overview," State of California, The Resources Agency, Department of Water Resources, 1974.

Nichols, K.E., "Modular Generation Technology With The Geopressured–Geothermal Resource," Proceedings, Industrial Consortium for the Utilization of the Geopressured–Geothermal Resource, Houston, TX, 1990, vol. 1, Mar. 1990, pp. 43–49.

Spencer, F.J., "Factors Affecting The Economics Of Desalination Of Water," Proceedings, Industrial Consortium for the Utilization of the Geopressured–Geothermal Resource, Austin, TX, 1990, vol. 2, Feb. 1991, pp. 93–101.

Tribus, M., "Kalina Cycle System 12 And Cascade Rankine Cycle for Geothermal Power Generation," Proceedings, Industrial Consortium for the Utilization of the Geopressured–Geothermal Resource, Austin, TX, 1990, vol. 2, Feb. 1991, pp. 153–182.

CRC Handbook of Chemistry and Physics, CRC Press.

FIG. 7

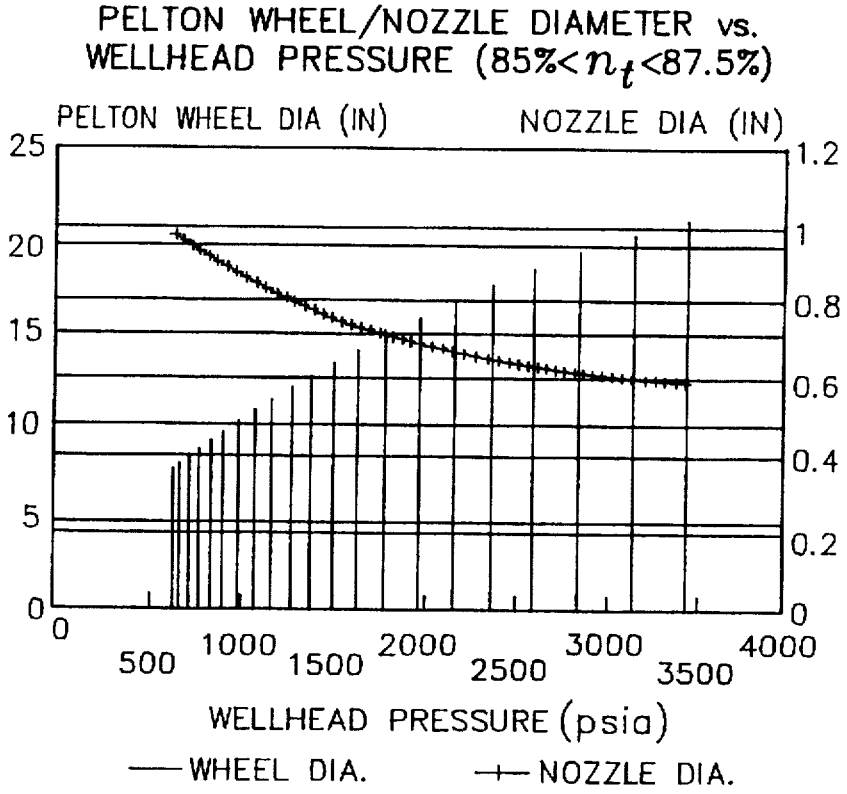

FIG. 8

TABLE I: PB#2 BRINE AND GAS ANALYSIS

PLEASANT BAYOU NO. 2 BRINE ANALYSIS

| DESCRIPTION | Mg/l |
|---|---|
| DISSOLVED SOLIDS | 131360 |
| CHLORIDE | 77080 |
| SODIUM | 42200 |
| CALCIUM | 8700 |
| POTASSIUM | 1860 |
| BARIUM | 760 |
| MAGNESIUM | 580 |
| BICARBONATE | 340 |
| SILICA, DISSOLVED | 96 |
| AMMONIA | 91 |
| IRON | 56 |
| ALL OTHERS | ppm<50 |

pH = 5.8
TOTAL HARDNESS = 27100 ppm $CaCO_3$
Sp.gr. @ 60°F = 1.09

PLEASANT BAYOU NO. 2 GAS ANALYSIS

| COMPONENT | MOLE% |
|---|---|
| METHANE | 86.31 |
| CARBON DIOXIDE | 9.06 |
| ETHANE | 3.11 |
| PROPANE | .99 |
| ISO-BUTANE | .17 |
| NORMAL BUTANE | .16 |
| ISO-PENTANE | .04 |
| NORMAL PENTANE | .02 |
| HEXANES | .04 |
| HEPTANES PLUS | .02 |
| NITROGEN | .05 |
| HYDROGEN | .00 |

BTU/scf WET = 952.40
DRY = 696.36
Sp.gr. @ 60°F (AIR=1.00) = .6768

TABLE II: SYSTEM PERFORMANCE

| ITEM | P (PSIA) | T(°F) | $H_2O_{out}(\frac{lb}{g})$ | $BRINE_{out}(\frac{lb}{g})$ | POWER (kw) |
|---|---|---|---|---|---|
| TURBINE | 200.0 | 280.0 | . . . . | . . . . | 727.000 |
| EFFECT #1 | 34.8 | 259.0 | 1.97 | 86.13 | 0.000 |
| EFFECT #2 | 22.4 | 234.0 | 4.19 | 81.94 | 0.000 |
| EFFECT #3 | 14.0 | 209.4 | 6.21 | 75.73 | −0.137 |
| EFFECT #4 | 8.3 | 184.5 | 8.04 | 67.70 | −0.346 |
| EFFECT #5 | 4.7 | 159.2 | 9.64 | 58.05 | −0.543 |
| EFFECT #6 | 2.4 | 132.8 | 11.04 | 47.01 | −0.715 |
| EFFECT #7 | 1.1 | 104.5 | 12.18 | 34.78 | −0.847 |
| COOL. PUMP | . . . . | . . . . | . . . . | . . . . | −90.000 |
| TOTALS | | | 53.27 | 34.78 | 634.412 |

SYSTEM FOR USING GEOPRESSURED-GEOTHERMAL RESERVOIRS

Matter enclosed in heavy brackets [ ] appears in the original patent but forms no part of this reissue specification; matter printed in italics indicates the additions made by reissue.

CROSS-REFERENCE TO RELATED PATENT

*This is a reissue application of U.S. Pat. No. 5,165,235, which issued on Nov. 24, 1992.*

COPYRIGHT NOTICE

®Copyright 1990 George Samuel Nitschke. All Rights Reserved.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNICAL FIELD

The present invention relates generally to systems for using geopressured-geothermal reservoirs; and, more particularly, to systems for production of fresh water, generation of electrical power, and stabilization of earthquake susceptible regions using geopressured-geothermal reservoirs.

BACKGROUND ART

As of the summer of 1990, the drought in California will be in its fourth year. This drought is causing a serious detrimental impact on the economy and environment in California. In 1977, California suffered a similar drought which caused a $2.4 billion loss. The current drought, however, is even worse. Indeed, the disastrous effects of the California drought are being felt by other states and, if the problem is left unresolved, could soon be realized by the nation at large.

As the population in California increases, so does the strain on its finite water resources. A [long term] *long-term* solution is needed that will not only sustain California through drought years but will also accommodate its growth.

Present plans for dealing with the problem call for increased water transfers from surrounding states. Such plans even include the possibility of cutting a canal to the Columbia River system. If this is done, it would no doubt result in the same sort of debauching that California has experienced in its use of the lower Colorado River. Such plans are neither environmentally sound, nor are they [long term] *long-term* solutions.

Many of the below-listed papers and articles relate to various aspects of this problem and the efforts and suggestions which have been made to resolve it. The remaining papers simply relate to engineering principles and empirical data which are relied upon in the following calculations. The papers include: (a) Drought Contingency Planning Guidelines for 1989, State of California, The Resources Agency, Department of Water Resources, January, 1989; (b) "Californians Won't Face Watery Truth"; Cameron, Mindy; Seattle Times, May 27, 1990; (c) Dorfman, Myron H., "Geopressured-Geothermal Energy and Associated Natural Gas", Proceedings, Eleventh Annual Energy Source Conference and Exhibit, 1988, pp. 97–101; (d) Riney, T. D., "Gladys McCall Geopressured Reservoir Analysis", Proceedings, Eleventh Annual Energy Source Conference and Exhibit, 1988, pp. 153–160; (e) Chacko, J. John, "Geology of the Gladys McCall Geopressured-Geothermal Prospect, Cameron Parish, Louisiana", Proceedings, Eleventh Annual Energy Source Conference and Exhibit, 1988, pp. 115–121; (f) Csanady, G. T., Theory of Turbomachines, McGraw-Hill, New York, 1964; (g) Ikoku, Chi. U., Natural Gas Production Engineering, Wiley, New York, 1984, chapter 4.3; (h) CRC Handbook of Chemistry and Physics, CRC Press; (i) Street, E. H. and Tomson, M. B., "Scale Inhibition During Coproduction of Natural Gas", Proceedings, SPE Gas Technology Symposium, 1988, pp. 161–170; (j) Klementich, Erich F. and Jellison, Micheal J., "Tubing String Design Considerations for Geopressured-Geothermal Wells", Proceedings, Eleventh Annual Energy Source Conference and Exhibit, 1988, pp. 123–137; (k) Wallace, R. H. Jr., Kraemer, T. F., Taylor, R. E., and Wesselman, J. B., "Assessment of Geopressured-Geothermal Resources in the Northern Gulf of Mexico Basin", Assessment of Geothermal Resources of the United [States-1978] *States, 1978*, Geological Survey Circular 790, pp. 132–155; (l) Rubin, Hillel and Bemporad, Giorgio A., "The Advanced Solar Pond (ASP): Theoretical Aspects", Solar Energy, Vol.43, No.1, pp. 35–44, 1989; (m) Raleigh, C. B., Healy, J. H., Bredehoeft, J. D., "An Experiment in Earthquake Control at Rangely, Colorado", Science, Vol.191, pp. 1230–1237, March, 1976; (n) Segall, P., "Earthquakes Triggered by Fluid Extraction", Geology, Vol. 17, pp. 942–946, October, 1989; (o) Wetmiller, Robert J., "Earthquakes Near Rocky Mountain House, Alberta, and Their Relationship to Gas Production Facilities", Canadian Journal of Earth Sciences, Vol.23, pp. 172–181, 1986; (p) Eaton, B. A., Featherson, C. R., and Meahl, T. E., "U.S. Gulf Coast DOE Geopressured-Geothermal Energy Program Field Research Site Operations FY 1986 To Present[,] Accomplishments and Goals", Proceedings, Eleventh Annual Energy Source Conference and Exhibit, 1988, pp. 103–108; and (q) Azari, M., "Average Aquifer Pressure and Reserve Estimates in Geopressured-Geothermal Reservoirs", Proceedings, Eleventh Annual Energy Source Conference and Exhibit, 1988, pp. 81–87.

The inventor believes the known prior art taken alone or in combination neither anticipate nor render obvious the present invention. Reference to the foregoing materials does not constitute an admission that such disclosures are relevant or material to the present claims. Rather, such materials relate only to the general field of the disclosure and are cited as constituting the closest art of which the inventor is aware.

DISCLOSURE OF INVENTION

The present invention is a process and/or combination of systems for using geopressured-geothermal reservoirs. More particularly, the present invention is a process and/or combination of systems for: producing fresh water; generating electrical power; and stabilizing earthquake susceptible regions, using geopressured-geothermal reservoirs.

It is estimated that the processes of the present invention would: provide as much as [forty-percent] *forty percent* (40%) of California's circa 1985 water demand of $1\times10^{13}$ gallon per year; provide a safe liquid waste disposal system; provide a measure of earthquake control; and be economically and environmentally sound.

In addition to having these positive qualities, the present invention overcomes and eliminates all of the previously mentioned disadvantages and does not expose users and their respective state governments to the aforementioned dangers.

To achieve these general and specific objectives the present invention comprises a three-part process that utilizes geopressured-geothermal reservoirs for the economical production of fresh water and electrical power. The controlled use of the geothermal reservoirs also allows for the control of regional earthquake intensity.

The first part of the process incorporates a system which comprises use of: a cased well bore; a pressure-reduction turbine and generator combination; a gas separator; a dryer; and a multi-effect distillation unit. The system uses the geothermal reservoir's pressure gradient to produce electricity by rotating the turbine/generator. The extracted natural gas may be separated and stored for later sale, or it may be used [on-site] *on site* as needed. The first part of this process also uses the thermal potential of the extracted brine to produce fresh water and saturated [salt-water] *saltwater* through the use of a multi-effect distillation unit.

The second part of the process uses the saturated saltwater, which is produced during the first part of the process, as a bulk material for the construction of solar ponds. Power generated by the solar ponds will continue to produce fresh water by desalinating seawater. This may be accomplished by a process known as reverse osmosis.

The third part of the process involves controlled brine production and subsequent waste disposal, the products of which are removed from or injected into wells located adjacent to a faulted geographical region. For example, a deliberate production and/or disposal process within the San Andreas Fault region could deintensify future earthquakes within that region. This process also permits effective disposal of liquid waste.

The foregoing three parts may be combined in any desired order and may be operated sequentially. For example, parts two and three of the process could commence before the completion of part one of the process which involves reservoir depletion. For California and many other areas, the combination of these three parts of the process could: (1) be used to help solve the water shortage problem; (2) provide means for liquid waste disposal; and (3) lessen the intensity of future earthquakes.

These and other objectives and advantages of the present invention will become more readily apparent upon reading the following disclosure and referring to the attached drawings.

BRIEF DESCRIPTION OF DRAWINGS

FIG. 7 is a line and bar graph illustrating Pelton Wheel and Nozzle Diameter versus Wellhead Pressure.

FIG. 8 comprises Table I which lists a brine and gas analysis for Pleasant Bayou No. 2 test well.

Figure 1:
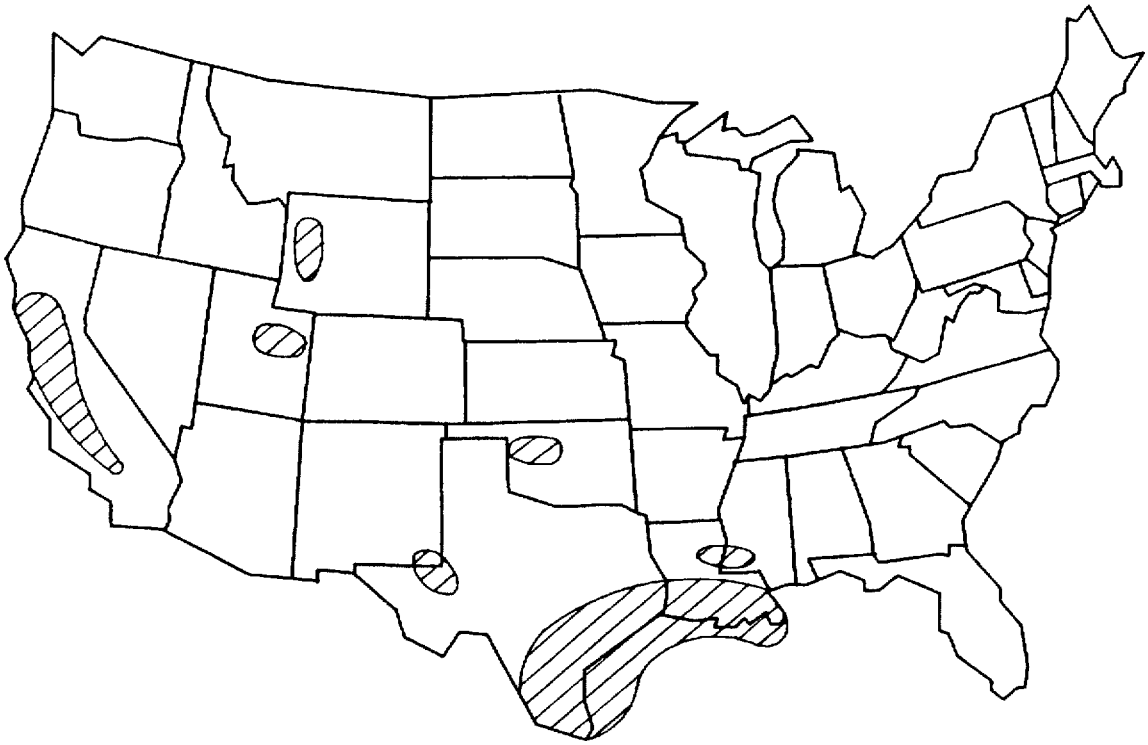
FIG. 1 PRIOR ART
FIG. 1 is a map of seven primary geopressured-geothermal basins in the United States of America wherein the present invention may be used.

One should understand that the drawings are not necessarily to scale and the elements are sometimes illustrated by graphic symbols, phantom lines, diagrammatic representations, and fragmentary views. In certain instances, the inventor may have omitted details which are not necessary for an understanding of the present invention or which render other details difficult to perceive.

BEST MODE FOR CARRYING OUT THE INVENTION

Geopressured-geothermal energy is usually found in the form of high pressure, high temperature, gas-laden brine reservoirs located at depths around 10,000 feet or greater below the earth's surface. Typically the temperature of the brine reservoir is between 250 and 400 degrees Fahrenheit. The wellhead pressures of the extracted brine are often between 3000 and 4000 pounds-per-square-inch. Such brine reservoirs also typically contain between 20 and 35 scf/bbl of natural gas which can be withdrawn at high [flow-rates] *flow rates* through a cased well bore.

Unlike [hot-water] *hot water* and/or steam producing geothermal energy, which is generally associated with volcanic formations, geopressured-geothermal reservoirs and/or aquifers are found in sedimentary formations beneath existing oil and gas reservoirs.

There are seven known primary geopressured-geothermal basins in the United States of America. These basins are cartographically illustrated in FIG. 1. A more detailed map of various geopressured-geothermal basins in the United States is shown in FIG. 2. The largest basin in the United States is located in the Texas-Louisiana coastal region. That basin is estimated to contain a gas reserve of 250 TCF (trillion-cubic-feet). That amount is equivalent to 137 percent (137%) of the presently developed conventional natural gas reserves in the United States. Due to the extensive oil and gas exploration that has already been conducted in that region, much documentation as to the geology and reservoir characteristics already exists. There are approximately sixty-six (66) known geopressured-geothermal basins within the world.

Although the particular [drive-mechanisms] *drive mechanisms* of these geopressured-geothermal reservoirs are as yet not fully understood, long-range flow characteristics can be predicted from several tests which were conducted by the United States Department of Energy (D.O.E.).

For example, one of these [flow-tests] *flow tests* was performed on the Gladys McCall well in Louisiana. The [flow-test] *flow test* revealed that an average of 20,000 barrels per day (bbl/day) of brine flowed continuously for four (4) years. When the [flow-test] *flow test* was completed in October of 1987, the well had produced 27 million bbls of brine with 676 million standard-cubic-foot (scf) of natural gas without any appreciable change to the bottom hole pressure.

Other flow tests conducted by the D.O.E. in the Gulf coast geopressured-geothermal region have indicated similar brine flow longevity.

The first part of the proposed three-part process employs a system which is designed to optimally convert the thermal and/or hydraulic potentials of the reservoir into electrical power. At the same time, natural gas may be separated from the brine for later sale or for [on-site] *on site* use.

The hydraulic energy stored within the reservoir, which creates a wellhead pressure, is converted into electrical power by allowing the pressurized brine to pass through a pressure-reduction turbine connected to a generator, which in turn rotates to generate electricity.

The thermal energy stored within the reservoir is passed through a multi-effect distillation unit to distill the brine into fresh water and saturated brine or saltwater. The saturated brine is produced as a by-product.

This first part of the process or system produces four distinct products: (1) electricity; (2) natural gas; (3) potable water; and (4) saturated brine.

The second part of the process utilizes the saturated brine, which is produced during the first part of the process, as a bulk material for the construction of solar ponds. The solar ponds could be built in areas such as the already naturally flat salt areas of southwestern California. The power produced by desalinated seawater within these solar ponds could supply much of California's water needs for an indefinite period of time.

The third part of the process involves the controlled production of saturated brine and the disposal of liquid waste into wells used in the first part of the process which are preferably located near geographical fault areas. This method would afford a certain measure of earthquake deintensification and control, while at the same time providing a safe disposal for various liquid wastes.

Figure 3:
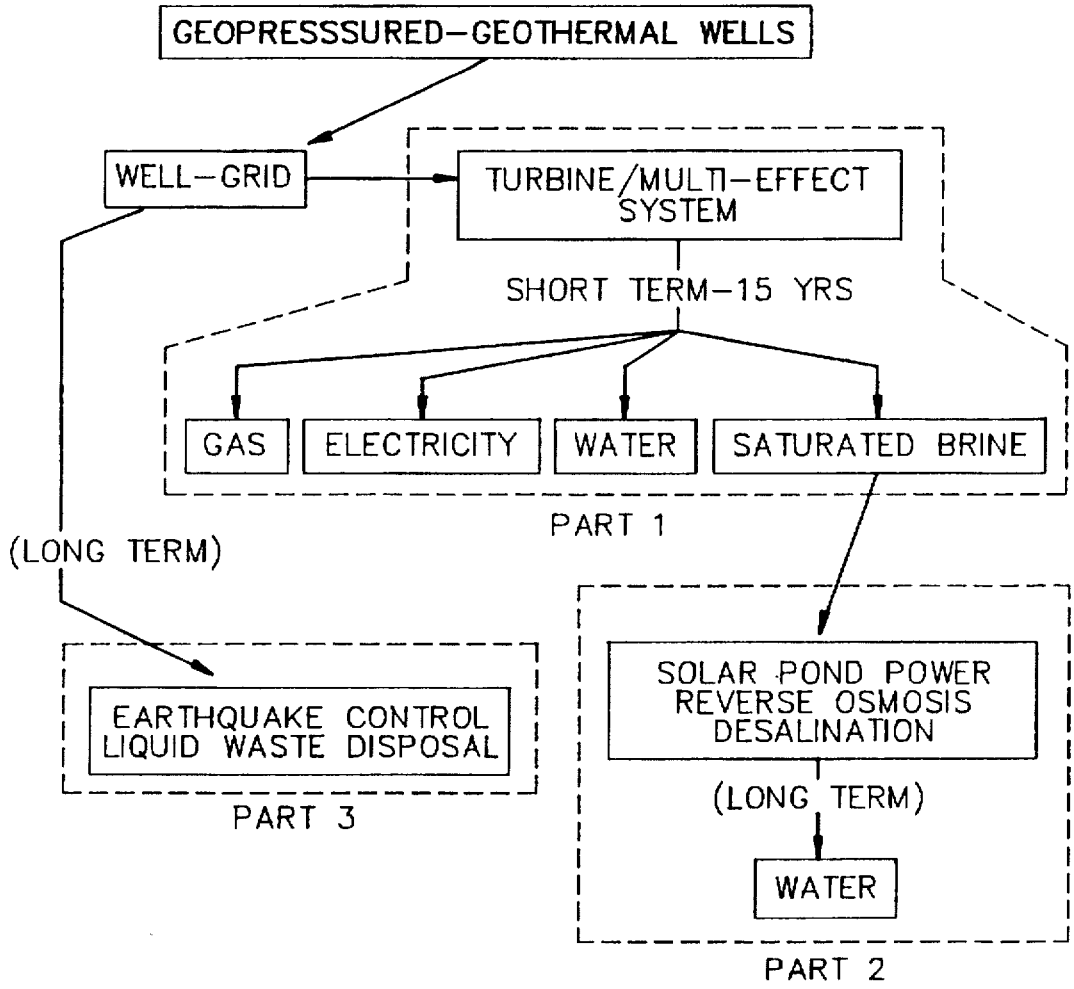
FIG. 3 is a schematic flow chart of the processes described therein.

The invention herein disclosed is the combination of two or more of the [above stated] *above-stated* three parts of the process. By way of review, the three parts include: (1) the geopressured-geothermal production of fresh water, electrical power, and separation of natural gas and saturated brine by means of a turbine/multi-effect system; (2) continued water production by reverse osmosis desalination of seawater within solar ponds, which are constructed as a by-product from the processes described in part one; and (3) the timely and controlled production of saturated brine and/or disposal of liquid waste within wells located near geographical faults to dispose of liquid waste and to control the intensity of earthquakes. A schematic flow chart of the three parts of the process is illustrated in FIG. 3.

THE SYSTEM

Turbine

A lined well, having a wellhead at its upper end, taps into a geopressured-geothermal reservoir. A pressure reduction turbine is positioned immediately downstream from the wellhead in such a manner that the reservoir's pressure gradient causes pressurized brine to be expelled through the wellhead into the turbine. The passage of the pressurized brine through the interior of the turbine causes the turbine and an associated electric generator to rotate. Conventional means for converting the rotation of the turbine into electrical current may be used.

The turbine, and, more particularly, the turbine nozzles which direct the fluid to drive the turbine, also serves to choke the flow of brine from the wellhead. Thus positioned, the turbine causes the flow of brine to have a lower pressure at the downstream end of the turbine. This lower pressure allows for a more efficient removal of the natural gas from the brine mixture.

A gas separator may be used to effectively remove the natural gas from the brine mixture. The gas separator diverts the wet gas (natural gas mixed with a certain amount of water vapor) to a dryer. The wet gas is then dried by burning a portion of the gas in a diethylene glycol dehydrator.

In applications where the removed natural gas would be sold, the lower pressure may be further controlled by the flowing pressure of a selected pipeline. In applications where the natural gas will be used on-site, the lower pressure may be further controlled by the limitations inherent in the gas drying processes. For example, the pressure may be controlled to optimize the costs of power to dry the gas verses the gas value.

As the pressure is lowered in either of the above situations, an ever increasing amount of water vapor is produced with the extraction of the natural gas from the brine.

For modeling the phase composition of the brine exiting the turbine, it is assumed that the brine will obey Henry's law. To further simplify the model, only carbon dioxide ($CO_2$), methane ($CH_4$), and ethane ($C_2H_6$) are considered significant components within the gas. All of the dissolved solids are lumped together as "salts" (shown in Table I of FIG. 8). The vapor pressure of the "salts" is approximated as zero for the working range.

Much of the data which was used for the following computations were taken from the flow test results gathered by the D.O.E. at the Pleasant Bayou No. 2. The Pleasant Bayou No. 2 is a geopressured-geothermal well located [South East] *southeast* of Houston, Tex.

Based upon the data obtained by the D.O.E. at the Pleasant Bayou No. 2 test well, the wellhead parameters are:

$P_{in}$=3500 psia $T_{in}$=280° F.

$m_t$=88.4 lbm/s (20,000 barrels per day)

GWR(gas withdrawal rate)=23.64 scf/bbl $Z_{H2O}=9.2265\times10^{-1}$ $Z_{salts}=7.4260\times10^{-2}$ $Z_{CH4}=2.6813\times10^{-3}$ $Z_{C2H6}=1.1223\times10^{-4}$ $Z_{CO2}=2.9647\times10^{-4}$ wherein P and T are respectively the pressure and the temperature of the brine solution entering into the turbine (or in other words, exiting the wellhead), $m_t$ is the mass [flowrate] *flow rate* through the turbine, and $Z_n$ is the total mole fraction of the constituent n. The effects of all other constituents, other than those listed, are considered negligible and are omitted from the model.

Turbine selection was based upon a specific speed analysis for a 2-pole, 60 Hz generator operating at 3600 rpm. Based on the aforementioned Pleasant Bayou No. 2 wellhead conditions, the specific speed for this application has a value of 0.042. This particular specific speed is best served by a single jet Pelton wheel turbine. The previously mentioned Csanady material gives equations for sizing the turbine's wheel and jet nozzle to achieve optimum performance which, for this application, yield diameters of 21.4 inches and 0.60 inches respectively. Given these dimensions and operating parameters, the turbine can be expected to run at 87.5% efficiency. The generator efficiency is assumed to be typical at 99%.

The power output of the turbine, taking into account the turbine and generator inefficiencies, is 974 hp (727 kW) for a 3300 psi pressure drop. Assuming that all inefficiencies are absorbed as an internal energy increase in the fluid, the fluid's temperature rises by only 1.0° F. Hence, the compositional phase change through the turbine is considered to be a constant temperature process at the inlet temperature of 280° F. By using Henry's law, together with mass and phase balance, the following equations can be written:

$$P_T y_i = x_i H_i \qquad i = 1\text{-}3 \text{ (gases)} \tag{1}$$

$$P_T y_j = x_j P_j \qquad j = 1, 2 \text{ (}H_2O\text{, salts)} \tag{2}$$

$$\sum_{n=1}^{5} y_n = 1 \tag{3}$$

$$\sum_{n=1}^{5} x_n = 1 \qquad n = 1\text{-}5 \text{ (all components)} \tag{4}$$

$$Z_n = x_n m_l + y_n(1 - m_l) \tag{5}$$

where $P_T$=pressure of composite fluid $y_i$=mole fraction of component i in gas/vapor phase $x_i$=mole fraction of component i in liquid phase $H_i$=Henry's constant for gas i $P_j$=vapor pressure of component j (H,P=f{T})

$m_L$=mole fraction of liquid in composite fluid.

Since Z is known and H and P can be found as functions of temperature, the above equations may be used to solve for the phase composition of the brine-gas-vapor mixture for a given pressure. It was found that above 3087 psia the fluid is in single phase for the Pleasant Bayou No. 2 test well.

Allowing for a turbine exhaust fluid pressure of 200 psia (3300 psi ΔP from the wellhead) entering a baffled separator tank, 6072 lbm $H_2O$ vapor/day will have to be removed from the separated gas to meet pipeline standards of no more than 7 lbm water/MMscf gas. A diethylene glycol (DEG) dehydration unit is suggested for this purpose. The heat requirements for operating the dehydrator are estimated at $1.5\times10^6$ BTU/hr. This requirement could be supplied from the dried gas and, for the reference flow rate of the Pleasant Bayou No. 2 test well, would result in a net dry gas production of $435\times10^3$ scf/day. The operating pressure for the separator may have to be altered dependent upon the flowing pressure of an available pipeline or the on-site usage line pressure.

Multi-Effect Distillation

Leaving the gas separator, the brine is throttled to a lower pressure in a first effect of a multi-effect unit. The first effect of the distillation unit acts as a flash chamber removing a certain volume of steam off the brine and starts the multi-effect cascading process.

Figure 4:
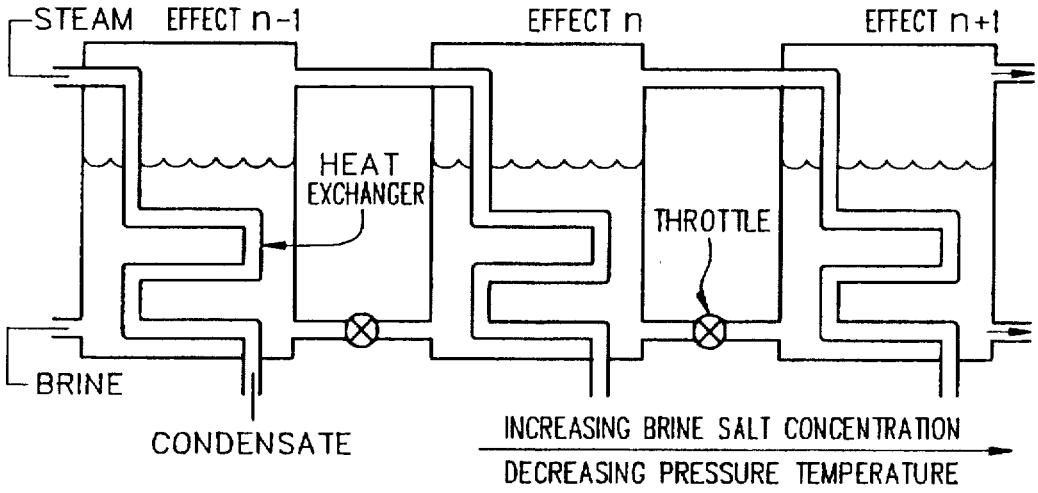
FIG. 4 is a schematic view of a basic multi-effect distillation system as described therein.

A multi-effect distillation system essentially operates like a series of flash-tanks, with one variation: the water vapor from each effect is routed through a heat exchanger located opposite the brine of the following effect, which has [at] a lower pressure and temperature. The multi-effect distillation system is shown in FIG. 4.

The multi-effect distillation system not only condenses the water vapor into liquid, by removing latent heat, it also transfers that latent heat back into the brine solution in the following effect to help drive the evaporation in that subsequent effect. The first and last effects are hybrid to this cascading distillation design in that the first effect has no prior effect's condensing vapor to help drive its evaporation, and the last effect's vapor has to be condensed by an out-of-system heat sink since there isn't any following effect.

As the brine moves through the multi-effect distillation system the pressure is lowered in a step-wise manner at each effect. This drives water vapor off the brine solution while increasing the salt concentration in the brine. The ever-increasing salt concentration causes a boiling point rise in the brine solution.

To achieve efficient heat transfer and fully realize the condensation and evaporation feature, the saturation temperature for the exiting steam in each effect must be sufficiently higher than the brine temperature in the following effect. An amount of desuperheating will occur in each heat exchanger as the steam, which is leaving the prior effect at that previous effect's pressure and temperature, is liberated from the brine solution.

When the brine enters the first effect, a large amount of steam is captured in the top of the effect. A slightly more concentrated brine solution is then removed from the bottom of the effect.

The conveyed brine is then throttled to yet a lower pressure and temperature in the second effect. The steam from the first effect, which has a higher pressure and temperature, is routed through a heat exchanger in the second effect. This process not only condenses the steam from the first effect, it also helps drive the vaporization process in the second effect.

Leaving the second effect, and each subsequent effect thereafter in the multi-effect cascade, the amount of steam produced increases and a greater concentration of brine solution is created. The fresh water condensate is continually removed from the heat exchangers.

The steam from the last effect will have to be condensed by an out-of-system heat sink, since there is no following effect to serve this purpose. For example, a cooling pond of seawater at 80° F. could be used as the out-of-system heat sink.

Using the laws of mass balance and the First Law of Thermodynamics, two separate equations can be written to model the steam production through the multi-effect distillation system: the first equation is for the first effect; and the second equation is for subsequent effects.

First effect:

$$(6)\ f_1 = C_p(T_1 - T_2)/h_{fg1} \qquad [(6)]$$

Subsequent effects:

$$[f_n = \{C_p(T_n - T_{n+1}) + h_{fgn}\{f_{n-1}/(1-f_{n-1})\}\}/h_{fgnb} \qquad (7)]$$

$$(7)\ f_n = (C_p(T_{n-1} - T_n) + h_{fgn}\{f_{n-1}/(1-f_{n-1})\})/h_{fgnb}$$

where $f_n$=mass fraction of brine vaporized in effect n $C_p$=average specific heat of brine $T_n$=temperature in effect n $h_{fgn}$=latent heat of vaporization for the condensing steam in effect n $h_{fgnb}$=latent heat of vaporization for the brine in effect n The simplification that NaCl represents the only soluble ions in the brine (all other soluble ions are comparatively low) is made to model the brine's salt concentration and boiling point rise through the multi-effect distillation system.

It is necessary to maintain the brine solution below the solubility limit to prevent solids from precipitating within the system. At the same time, the brine solution should be brought as close to the solubility limit as possible to maximize fresh water production. The assumption is also made that the solubility limit of the brine solution is that for NaCl in hot water, or 39.12 grams/100cc. The maximum mass fraction of salt allowable before reaching this solubility limit is 0.281. The relationship between the mass and mole fractions of NaCl in water[.] can be written as:

$$(8)\ m_{NaCln}=x_{NaCln}MW_{NaCl}/[MW_{H2O}(1-x_{NaCln})+x_{NaCln}MW_{NaCl}]\ [(8)]$$

where $x_{NaCln}$=mole fraction of NaCl in effect n mNaCln=mass fraction of NaCl in effect n MW=molecular weight Also, the mass fraction change for NaCl through each effect can be written as:

$$(9)\ m_{sen}=m_s/[m_n(1-f_n)]=m_{sin}/(1-f_n)\ [(9)]$$

where $m_{sen}$=NaCl mass fraction exiting effect n $m_{sin}$=NaCl mass fraction entering effect n $m_s$=NaCl mass flow rate through multi-effect $m_n$=brine mass flow rate into effect n Several additional simplifying assumptions are made in the modeling of the multi-effect system. The assumptions include: (1) the latent heat of vaporization and the specific heat of the brine is nearly that of pure water for the working range; (2) the throttling processes through the multi-effect are considered isenthalpic; (3) the desuperheating is considered negligible (less than 0.5% of heat transfer for condensation); and (4) the steam from the last effect is condensed by a heat exchanger with 80° F. water (obtained from the ocean or cooling pond).

The solution of equations (1) through (5) for the Pleasant Bayou No. 2 test well yields the following input conditions into the multi-effect for a turbine exhaust pressure of 200 psia:

$Z_{H2O}$=0.925

$Z_{CH4}$=1.28×10$^{-3}$ $Z_{CO2}$=9.56×10$^{-4}$ $Z_{C2H6}$=5.61×10$^{-5}$ $Z_{NaCl}$=0.03725

$m_1$=88.1 lbm/s

Figure 5:
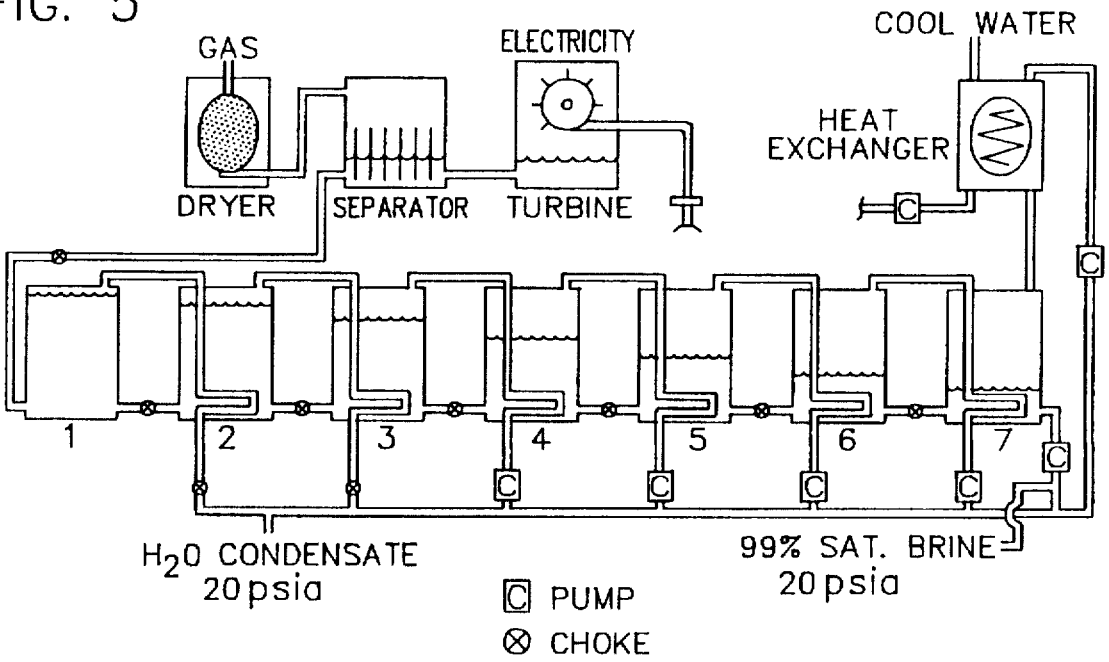
FIG. 5 is a schematic view of part one of the process as described therein.
Figures 9, 10:
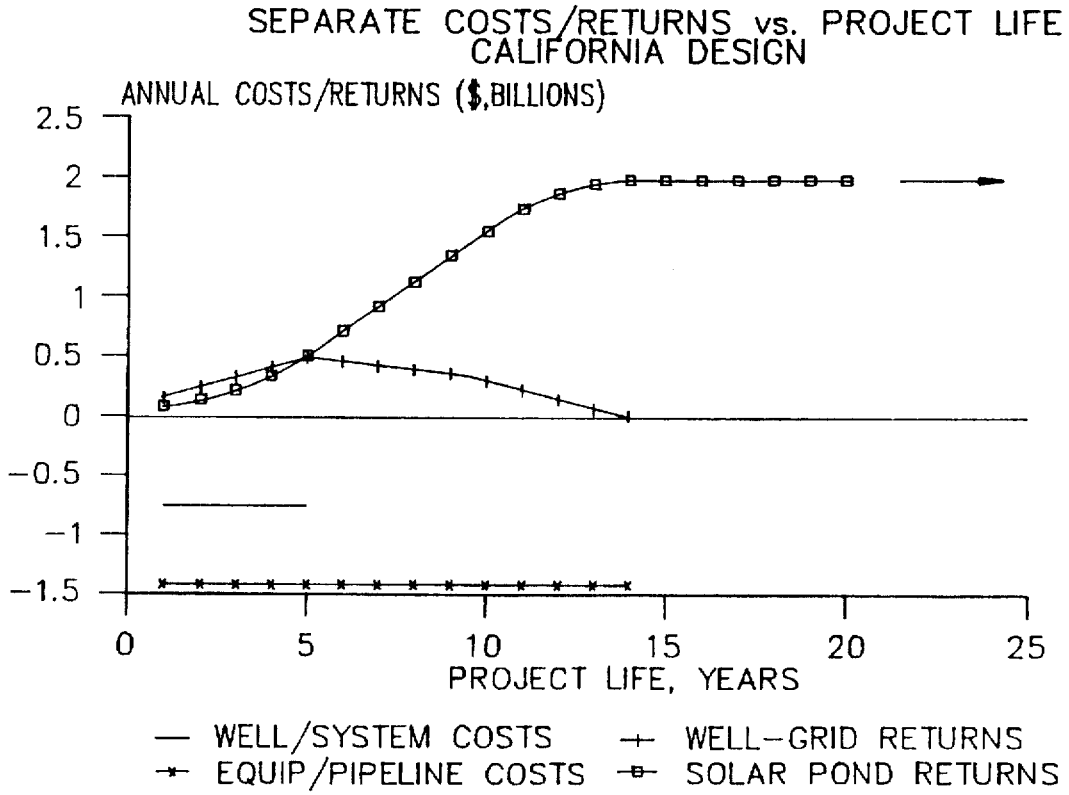
FIG. 9 comprises Table II which lists system performance for various successive effects.
FIG. 10 is a graph comparing the Annual Costs/Returns to Project Life.

With the aforementioned assumptions, the model of the multi-effect distillation system equations (6) through (9) predicted the performance listed in Table II of FIG. 9. The turbine and effects listed in Table II correspond to the same elements identified in FIG. 5.

The depicted seven-effect distillation system design reflects a 21° F. temperature drop, not including the individual boiling point rise, in each effect. This design was selected as the most efficient, in terms of heat transfer, to distill the brine at a 99% salt saturated composition and condense the steam from the last effect. Other combinations and number of effects could similarly be used.

The power requirements as given in Table II are based on a flow-line pressure of 20 psia for the condensate and brine, and an arbitrary head of 50 feet for the cooling pump. The trace amounts of non-condensable gases can be bled from the first and second effects, as their pressure is above atmospheric pressure.

Scaling/Corrosion in Casing and Surface Equipment

One of the major obstacles associated with the coproduction of gas and brine is the formation of calcium carbonate scale ($CaCO_3$) in the production tubing and surface equipment. As the fluid's pressure is lowered, from its shut-in formation pressure at the wellhead to a designated operating pressure, $CaCO_3$ precipitates and forms as scale.

In the proposed system this scale formation and growth would not only have the conventional adverse effects of restricting flow and possibly causing down-hole tubing failure, it could also severely impair heat transfer for brine distillation in the multi-effect distillation system.

It is, therefore, suggested that a phosphorate based scale inhibitor pill (as designed by Dr. Mason Tomson of Rice University in his earlier identified article) be used to remedy the scaling problem. The inhibitor pill is squeezed into the geopressured-geothermal formation and held [in-place] *in place* for approximately one day. When the well is again allowed to flow, the inhibitor interacts with the brine to prohibit $CaCO_3$ precipitation.

The inhibitor's success in virtually eliminating $CaCO_3$ scale has been observed on both the Gladys McCall and the Pleasant Bayou No. 2 test wells, with a squeeze frequency estimated at one per 8 million bbl of brine produced. This is approximately one inhibitor squeeze per year for the Pleasant Bayou No. 2 test well.

With the use of stainless steel material in the critical flow paths and proper materials selection in other areas, it should be possible to reasonably protect the surface components of the system against accelerated corrosion due to the absence of scale.

It has also been shown on the Gladys McCall and on the Pleasant Bayou No. 2 test wells that, by proper design of the production tubing string, long-term production can be realized without down-hole failure in the tubulars. Work is also being performed to design a corrosion inhibitor for heavy brine production.

THE CALIFORNIA DESIGN

Well-System Grid / Solar Pond Water Production

Figure 2:
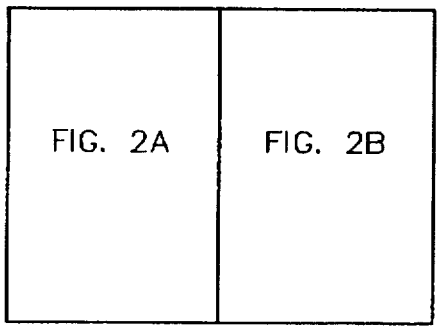
FIG. 2 PRIOR ART
FIG. 2 is a more detailed map of the United States of America illustrating various other geopressured-geothermal basins wherein the present invention may be used.
Figure 2A:
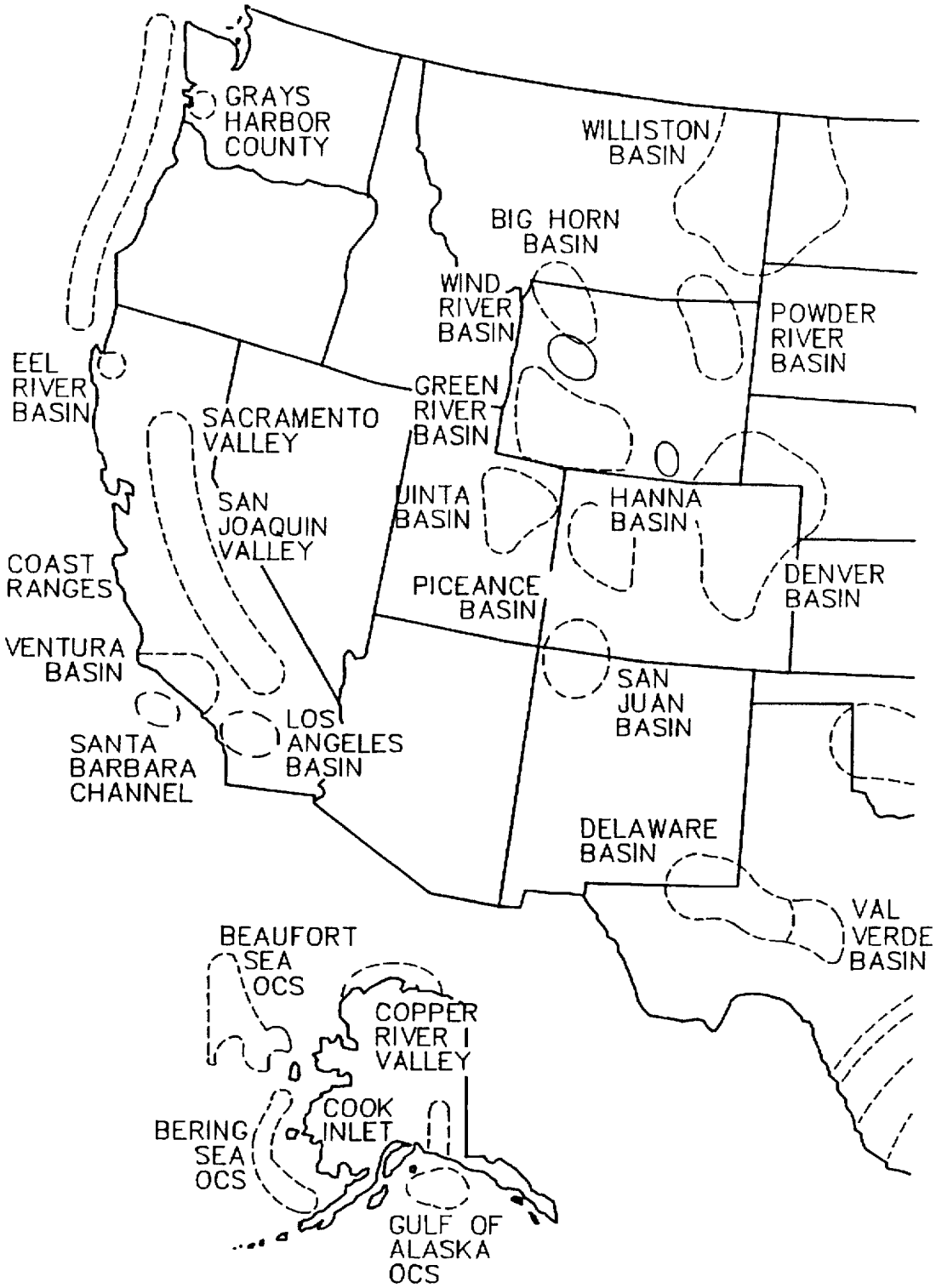
Figure 2B:
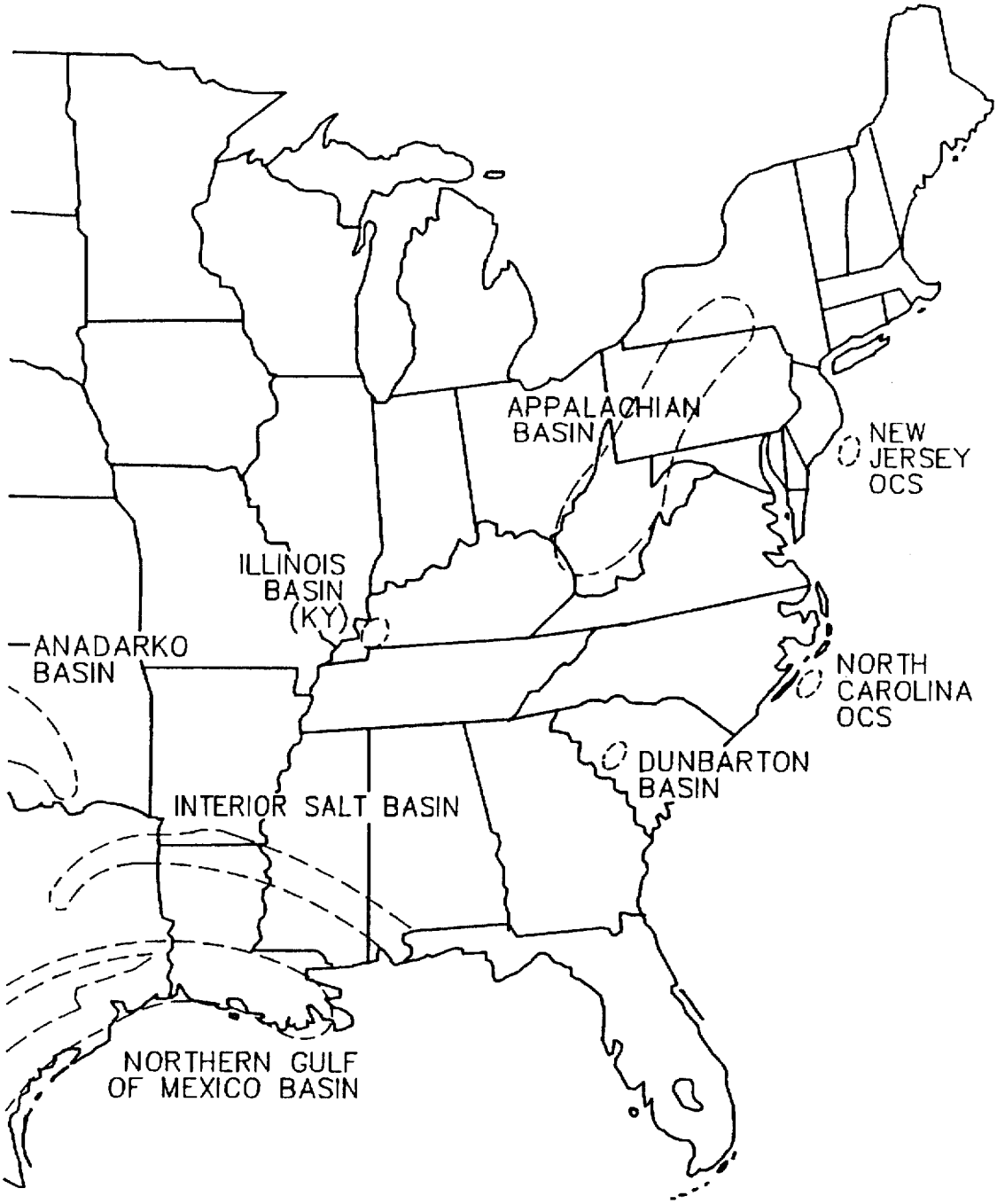

The Great Valley-Franciscan geopressured-geothermal basin in California, generally shown in FIGS. 1 and 2, covers an area of approximately 30,000 square miles and has similar fluid temperatures and pressure gradients as those found in the Gulf coast area. In the absence of specific site data, the proposed scenario assumes that the California basin will perform in like manner to that demonstrated in the Gulf coast basin.

A well-system grid could be established on the Great Valley. The number of wells would depend upon the basin's ability to support production. Assuming the basin could sustain a ten-year production on a 1000 [well grid] *well-grid*, or one well per 30 square miles, the estimated pure water production for the well-grid process at height of production would be approximately 530×10$^6$ gallons per day. This initial estimate of well-grid water production is roughly equivalent to 2% of California's 1985 total water consumption.

The saturated brine by-product could then be piped to [south-central] *south central* California where natural [salt-flats] *salt flats* already exist. The saturated brine by-products could then be used as bulk material for the construction of solar ponds.

Solar pond technology has made considerable advances in recent years, particularly in the Dead Sea area of Israel, and today stands as a well-demonstrated science.

A solar pond is a shallow, concentrated saltwater lake that establishes a well-defined temperature gradient by absorbing solar energy. This temperature gradient can be used to drive a Rankine cycle for power production.

During the well production phase, the 1000 wells would produce enough brine to construct a six foot deep, 850 square mile solar pond (roughly two times the size of the Salton Sea in southern California).

An advanced solar pond, recovering an 80% Second Law efficiency from its Rankine cycle, could generate a twenty-fold increase in the fresh water production realized from the wells by desalinating seawater in a 30 Whr/gal reverse osmosis process. The reverse osmosis process could be partially performed on an on-line basis. For example, it could occur before the end of the well production phase. At its fullest potential this process would supply around 40% of California's total water consumption demand, including the requirements of industry and agriculture.

Earthquake Control/Waste Disposal

In areas where the well-system grid would encompass or border geographically faulted zones, in particular the San Andreas fault, it could be laid out in accordance with C. B. Raleigh's proposed model for earthquake control. Mr. Raleigh's proposed model is explained in his [above identified] *above-identified* article.

At the risk of over simplification, the method would allow areas of high [plate-stress] *plate stress* build-up to be hydraulically "jacked" over the locked zones in a controlled slip fashion, analogous to letting the air out of a tire slowly versus a blowout (intense earthquake). This concept is depicted in FIGS. 6A, 6B, 6C, and 6D.

The arrows in FIGS. 6A, 6B, 6C, and 6D illustrate the direction of strain build-up over or adjacent [to] a locked geographic zone. The lines depict the existing or intended fracture line for stress relief.

Figure 6A:
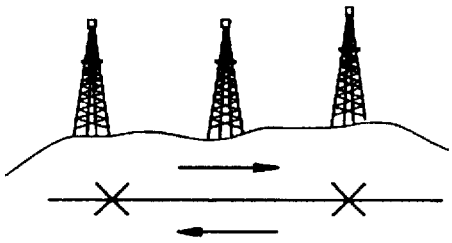
FIGS. 6A, 6B, 6C, and 6D are schematic views illustrating varying directions of strain build-up which can occur within adjacent zones of locked geographical strata, and the basic earthquake control scheme.

As shown in FIG. 6A, heavy de-watering of the outside two wells creates fracture "seats" (the large "X"s) which strengthen that area's resistance to slip.

Figure 6B:
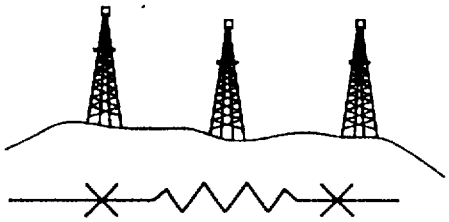

As shown in FIG. 6B, the inner well may be used to inject heavy fluid into the underlying strata, thereby, "jacking" the fracture apart and generating a minor earthquake, having an intensity which is proportional to the distance between the wells. If the distance between the wells is approximately five kilometers, a minor earthquake of approximately 4.5 or less on the Richter scale could be generated to propagate stress relief through the locked zone.

Figure 6C:
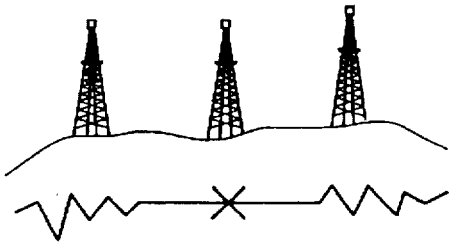

As shown in FIG. 6C, the inner well is then used to extract the previously injected heavy fluid to "seat" or strengthen the fracture line.

Figure 6D:
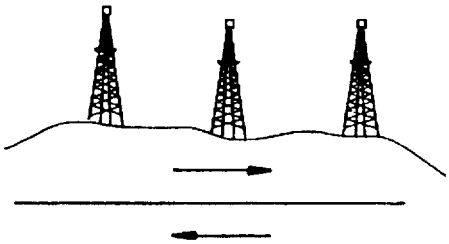

As shown in FIG. 6D, the outer two wells are then used to inject heavy fluid into the underlying strata to "unseat" the fracture, again allowing a minor earthquake to propagate stress relief as the plates slip.

The magnitude of the induced earthquakes is kept low by the near proximity of the wells. To accommodate the necessary slippage along the San Andreas fault of 2 to 3 cm/year, this cycle would need to be repeated approximately once every six months for wells spaced at five kilometers.

The relationship between down-hole extraction and injection and the intensity of earthquakes has been documented in a number of areas. Low permeability in the deep fault zone is of prime concern to the reduction of risk and success of this method. An assessment of the performance of this method can not be fully made until a test zone is drilled and operated.

While it may be possible to induce a stress relieving tremor with heavy injection, adequate permeability must be assured for the strengthening and/or seating of the plates in the intentionally locked regions.

Even though the first two parts of the disclosed process, which specifically address California's water crisis, are able to function without the incorporation of the earthquake control method, all three of these systems may be used in conjunction with one another.

Where all three processes are used, the brine by-product of the outer two wells in FIG. 6A would be routed to the solar ponds until such time as injection of the liquid waste was needed at the central well to stabilize or destabilize the region, or to [simple] *simply* dispose of the waste. The extracted brine from the outer wells is then routed to the solar ponds until the outer wells are shut-in.

As shown in FIG. 6B, when desired or needed, the central or inner well could be used to inject a high-volume of brine and/or liquid waste at a [high-pressure] *high pressure* into the underlying strata to destabilize the central area of the fault.

Once strain release is accomplished, fluid may be removed from the central well and the outer two wells are used to inject brine and/or liquid waste into the strata as shown in FIG. 6C. The brine removed from the central or inner well could be diverted from the solar ponds and used for the above-described purposes. As the injection cycle is completed on the outer two wells, shown in FIG. 6D, the sequence would start over. Thus, this method allows all three wells to be producing while still deriving the desired earthquake slippage control.

It bears noting that [well-shear] *well shear* could present a minor problem. However, in many areas, it is anticipated that the fracture line will occur below the producing and injecting wells.

Depending upon whether the geology provides an impermeable shale above and below the producing sandstone, after well production has been completed and the previously underlying reservoir basin is spent, the in-place well system may be used for deep disposal of treated liquid waste and sewage. In some areas of California such sewage is currently being dumped directly into the Pacific Ocean not more than a few hundred yards offshore. The in-place pipeline system that initially carried the well-grid produced fresh water to the coast, would then be used to return the liquid waste to the spent geopressured field. It should be possible to "leap-frog" this waste into the spent basin through the fault line slippage control wells, thereby[.] further benefiting from the previously installed [well system] *well-system* grid.

In areas of the basin where reservoir communication is prevalent, the injection pressure for the liquid waste could be kept relatively low by injecting the liquid waste into the lower portions of the spent pay-zone and allowing unprocessed brine to flow from the top.

The pipeline to the solar ponds would continue its usefulness in routing this bleed-off unprocessed brine to the solar ponds. The bleed-off unprocessed brine may be used to replenish the solar pond's losses due to evaporation.

It should be noted that this portion of the process, wherein liquid waste is disposed within the spent reservoir, can be used independently from the earthquake control processes.

It is assumed that a 30 square mile reservoir has approximately a ten-year life. This assumption is very conservative. Indeed, the overall production capabilities of the Great Valley Basin could be much greater, provided the basin behaves similarly to the test wells made along the Gulf coast.

With the water situation in California worsening on a daily basis, due to drought and population growth, the merits and benefits of a long-term clean water source, along with the potential benefits of earthquake control and a sound liquid waste disposal system, speak for themselves. While financial and governmental restrictions might prevent the initiation of this technology on a commercial basis in time to significantly assist the current California drought crisis, this technology will provide relief and possibly a cure for future problems to be faced by the people of California. The present invention is both economically and environmentally sound.

While the above example deals with "The California Design", it is to be clearly understood that the described processes could be used in many other areas of the United States and world.

PROJECTED ECONOMIC ANALYSIS

Although not required for an understanding of the claimed invention, the inventor wishes to set forth the following projected economic analysis which clearly illustrates the economic feasibility of putting this invention into practice.

Well Costs Estimation

For the sake of this cost analysis, a producing well depth of 15,000 ft, with a similar casing schedule as that used on the Pleasant Bayou No. 2 test well is assumed. The production depth for the Pleasant Bayou No. 2 test well was 14,700 ft. The drilling conditions are assumed to be nominal for soft to medium formations. With these assumptions, the well costs are estimated as follows:

| | |
|---|---|
| Conductor: 126' of 26" at $60/ft = | 7,560 |
| Surface: 1400' of 20" at $59/ft = | 82,600 |
| 1st Intermediate: 8500' of 13⅜" at $35/ft = | 297,500 |
| 2nd Intermediate: 13,000' of 9⅝" at $28/ft = | 364,900 |
| Liner: 2500' of 7" at $28/ft = | 70,000 |
| Tubing: 15,000' of 5½" P-110 at $15.50/ft = | 240,250 |
| Misc. equip. (wellhead, hanger, etc., est.) = | 138,090 |
| 60 days rig time at $7500/day = | 450,000 |
| Drilling muds (est.) = | 250,000 |
| Service Co. (cementing., logging, etc., est.) = | 350,000 |
| | $2,259,000 |

These estimates are only a guideline. Hole problems encountered while drilling and completing the well can greatly increase the costs (i.e., lost circulation of drill mud, down-hole tool failure, [etc.)] *etc.*). These costs are not representative of the initial test wells required to determine the reservoir horizons of a particular geopressured-geothermal region, as time and money have not been allotted for extensive flow tests, elaborate logging, etc. Rather, these estimates reflect conditions expected for in-field drilling.

The foregoing assumptions are considered reasonable since many geopressured basins are typically concurrent with existing oil and gas fields where the documentation of reservoir geology has largely already been completed. In certain areas it may even be possible to re-enter and complete a played-out oil or gas well, as with the Pleasant Bayou No. 2 test well.

The post-operating plug and abandonment costs are omitted as the wells of the disclosed process will continue to be used for waste disposal and solar pond replenishing.

System Costs

The system costs are estimated by the following schedule:

| | |
|---|---|
| Multi-Effect: | |
| 115,000 ft of 1" Al or Cu heat exch. tbg. at $1.00/ft | 115,000 |
| 4000 man-hours for a certified welder at $25/hr | 100,000 |
| 4000 man-hours for a welder's helper at $10/hr | 40,000 |
| Pumps, chokes, controls, additional materials | 245,000 |
| Seawater pipeline or cooling pond | 500,000 |
| Peripherals: | |
| DEG dehydrator | 20,000 |
| Gas separator and controls | 20,000 |
| Pressure reduction turbine with generator | 350,000 |
| Misc. | 360,000 |
| | $1,750,000 |

In the above-listed schedule, the tubing length is dictated by the heat transfer requirements of the heat exchangers in the multi-effect distillation system. The man-hours are estimated at 18,000 full-pass welds around [1'] *1"* tubing to fabricate the heat exchangers (estimated at 10 minutes/weld) plus an additional 1000 welding hours for the rest of the system. The rest of the system component's costs were estimated by conversations with industry personnel.

A manufactured multi-effect distillation plant is available from Israel Desalination Engineering Ltd. (IDE), Tel Aviv, Israel. The IDE plant is designed for lower brine temperatures, having a maximum temperature of 158° F. Hence, the IDE plant uses horizontal tubes in driving falling film condensation. The geopressured-geothermal brine temperatures of between 250 and [400.F] *400° F.* are capable of driving nucleate-boiling/dropwise-condensation. Vertical tube heat exchangers would be more efficient for heat transfer and, therefore, are proposed for the system. The inventor is unaware of any readily available manufactured multi-effect distillation system fully applicable to geopressured-geothermal brine.

Well-Grid Maintenance Costs

The cost for the phosphorate based scale inhibitor squeeze treatment has been averaged at $0.0038/bbl of brine produced on the Gladys McCall site. For the reference brine production rate of 20,000 bpd ($7.3\times10^6$ bbl/yr) the treatment cost per system is approximated as $30,000/yr. The per annum maintenance schedule is estimated as:

| | |
|---|---|
| Inhibitor squeeze treatment | 30,000 |
| Operator (one person/system) | 50,000 |
| Repairs, general maintenance, | 100,000 |
| and DEG replenishing | |
| | $180,000/yr |

Well-Grid Revenues

For this analysis the commodities of gas, water, and electricity are given a value estimated at 50% of commercial rates for medium-sized industries. These rates, based upon a mid-range value of the usage fee, were quoted for Houston and San Francisco as they are located near the two largest U.S. geopressured-geothermal basins (shown in FIG. 1). With this in mind, the following is the baseline for returns.

Gas: $2.00/Mscf

Electricity: $0.045/kWhr

Water: $1.00/1000 gal

In addition, the wellhead pressure is assumed to decline linearly with time after the first four years of production, while maintaining a constant flow rate, until the lowest allowable operating pressure is reached. This will effect the amount of electricity that the system is able to produce, decreasing as the wellhead pressure declines. It is also assumed that the GWR remains constant through the flow life. These assumptions are considered conservative, in light of the four-year Gladys McCall test, and are in keeping with simulator runs of geopressured-geothermal reservoirs modeled by Mr. M. Azari of the University of Wyoming. It is also allowed that the salt content of the brine remains constant.

With the above assumptions, on a daily basis in the first four years of the well-grid's production, the expected baseline returns are:

| | | |
|---|---|---|
| Gas: | 435 Mscf at $2.00/Mscf = | $870 |
| Electricity: | 15.2 [Mwhr] MWhr at $0.045/kWhr = | $684 |
| Water: | 546, 000 gal at $1.00/1000 gal = | $546 |
| | | $2100 |

The low-end operating pressure is determined by the power requirements to run the pumps and controls, of the particular system, and the turbine/generator output. For the Pleasant Bayou No. 2 test well example, the minimum wellhead pressure would be 650 psia.

To maintain a turbine efficiency of 85% to 87.5%, while keeping the volume flow rate constant with the decreasing available head, it will be necessary to continuously increase the diameter of the adjustable flow nozzle and periodically reduce the diameter of the Pelton wheel. It is suggested that this resizing be done in accordance with the predicted replacement of the wheel's buckets due to washout, and as such is already included in the maintenance schedule.

A plot depicting the frequency of resizing the Pelton wheel as a function of wellhead pressure is shown in FIG. 7, along with the corresponding nozzle diameter. The specific speed of the turbine at the lowest operating pressure of 650 psia is 0.17, still within the range for a single-jet Pelton wheel. Two-phase flow at these lower wellhead pressures can be managed with a surge tank (included within the miscellaneous costs) ahead of the turbine to remove and throttle the gas phase to the separator.

Solar Pond Costs / Revenues

In addition to the solar ponds, associated power generating facilities, and desalination stations, the second part of the process will require a triad of pipelines. One pipeline is required to route the initial fresh water produced by the well-system grid from the geopressured field to the areas where it is needed, namely the populated coastal regions. A second pipeline is required to divert the saturated brine from the well-system grid to the solar pond fields. A third pipeline is required to distribute the fresh water produced from the desalination stations, wherever they may optimally be located, to a point of use. As noted previously herein, the first two of these pipeline systems would serve double-duty, and the third system would be used indefinitely, so that the impact of their cost would be minimized.

To date, no detailed study has been conducted to offer a firm estimate of the costs involved for this portion of the California Design. For this economic analysis, however, the cost of the pipeline triad and the cost for the construction of the solar ponds, power generating facilities, and desalination stations are lumped together and are estimated at $20 billion. While this figure is very rough, it is not entirely arbitrary. It is generated by comparing the scope of the project to the costs incurred with projects of similar magnitude (i.e., Dutch Shell's estimate of $10 billion for a pipeline across the Peruvian Andeas).

At full production, the solar ponds would produce around $1.1\times10^{10}$ gallons per day of fresh water, or roughly 40% of California's total water load, based upon California's 1985 consumption. At the given baseline returns for water at $1.00/1000 gal, this figure would gross about $4 billion annually.

For this study the somewhat arbitrary amount of 50% has been selected for the operating expenses on the power generation/desalination processes, so that a $2 billion annual net return is considered.

No consideration will be ventured here as to the costs/benefits of the waste disposal/earthquake control scenario. It is conjectured, however, that the addition of these elements (i.e., waste disposal fees, reduction of earthquake damage, etc.) will greatly improve the overall economic picture.

It's worth noting, when examining these projected capital costs of $24 billion (i.e., $4 million/system×1000 systems +$20 billion =$24 billion), that the canal scheme proposed for California mentioned earlier carries with it a projected capital cost of $200 billion. The solution herein explained would not only be economically superior, it is also a [long term] *long-term* solution and is environmentally sound. In comparison, the other proposed solutions, particularly the canal scheme, are not.

The Overall Picture

Figure 11:
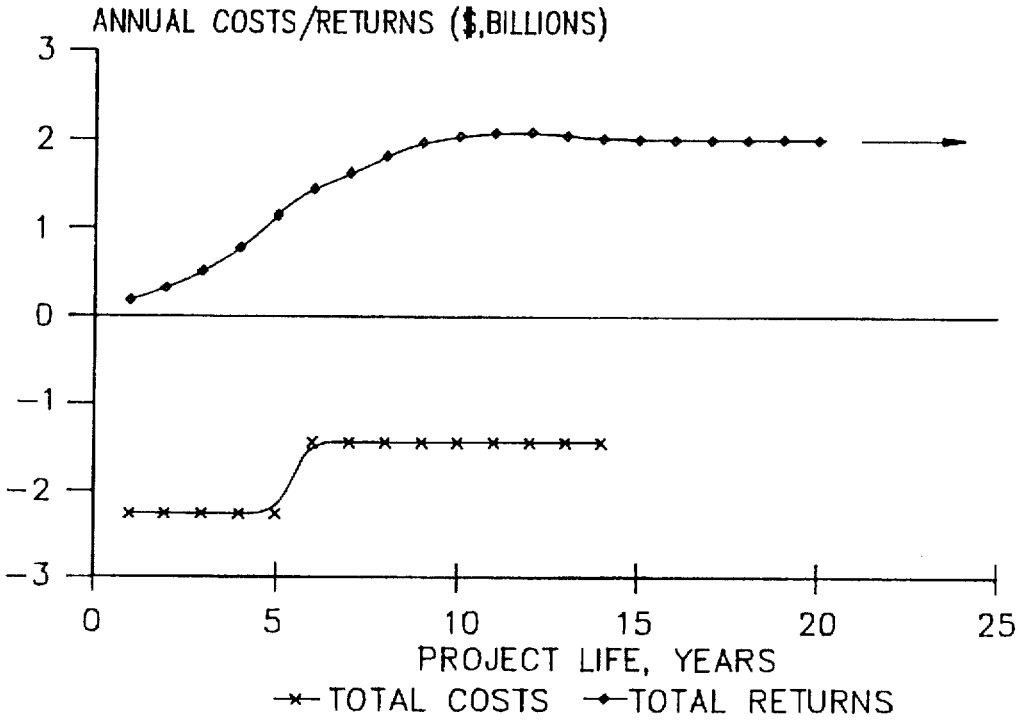
FIG. 11 is a graph comparing the total Annual Costs/Returns of FIG. 10 to Project Life.
Figure 12:
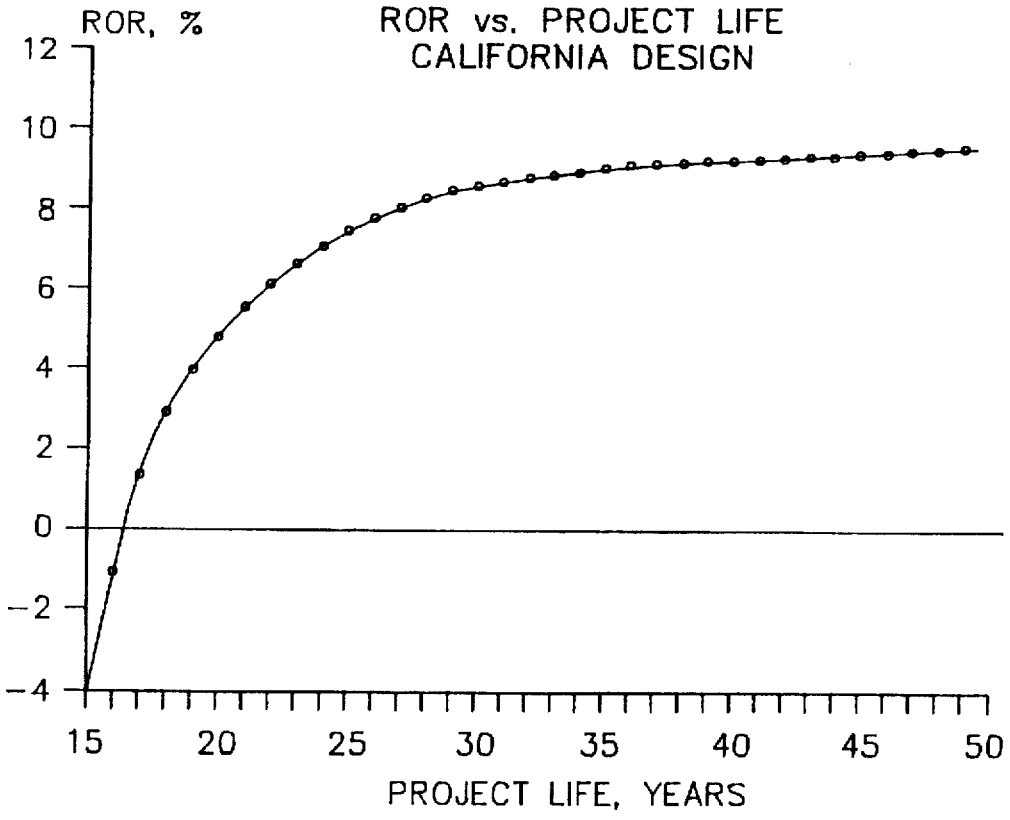
FIG. 12 is a graph comparing the Rate Of Return to Project Life.

The overall projected economic picture is summed up in FIGS. 10 through 12. FIG. 10 shows a simplified breakdown of the costs and returns over the life of the project.

Well/System Costs: The 1000 well/system installation is valued at $4 billion, which is $4 million for each well. The cost is affixed in equal annual assessments over the first five years. Completing the well-grid in five years would require mobilizing 40 drilling rigs, each finishing five wells per year.

Equip./Pipeline Costs: The cost of the solar pond power generation facilities, reverse osmosis desalination stations, and the needed pipelines are estimated at $20 billion. This cost is distributed evenly over the first 14 years, at which time the solar pond would be in full production.

Well-Grid Returns: The well-grid returns line graph represents the net annual returns, after taxes and expenses, for the well-grid's water and power. Electricity revenues per well decline linearly after the [forth] *fourth* year as the wellhead pressure declines. Some of the electric power could be used to assist the transport of the brine to the solar pond field (in conjunction with using the gas for a gas-lift operation, such as to clear mountains).

Solar Pond Returns: The gross return at $1/1000 gallons of water is $4 billion annually. The plotted net return represents 50 percent of the gross going for operating expenses, taxes, etc., for a net annual return of $2 billion. This return will continue indefinitely, as represented by the arrow.

FIG. 11 simply illustrates the totals of FIG. 10, wherein: "Total Costs" is the sum of the two cost curves; and "Total Returns" is the sum of the two return curves, with the arrow again indicating the [long term] *long-term* nature of the solar pond production. Where the area between the total costs curve and the zero axis equals the area between the total returns curve and the zero axis, the project is at a break-even point.

A Rate of Return (ROR) analysis was performed on the project to determine the effect of project life on the proceeds. This analysis is shown in FIG. 12, wherein: "ROR", or the Rate of Return, is the interest rate earned on the unrecovered capital investment. Each annual return includes an equal installment towards repaying the capital investment, along with the interest earned at the given ROR on the unrecovered capital, such that at the end of the project life the capital investment is completely repaid. While no arrow is shown, the project could last well beyond 50 years. Where the ROR equals zero, the venture is at the break-even point. The 16.5 year break-even point can be verified by inspection of FIG. 11 (i.e., where the two curve areas are equal).

To recap, the conditions for the analysis were:

1) a 25% tax rate (reflecting State and Federal assistance);
2) ⅛ of gas revenues paid out in lease fees;
3) Double Declining Balance depreciation with a switch to Straight Line depreciation in the best year for accelerating the depreciation schedule;
4) $180,000/year operating expenses for each of the well-grid's systems;
5) a 360 day operating year;
6) zero salvage value at the end of the well life for the well-grid systems;
7) 50% of the gross revenues from the solar pond's water production is used for operating expenses;
8) the baseline returns for utilities as spelled out earlier in this application; and
9) no proceeds are realized from the earthquake control/waste disposal benefit.

Where the ROR is equal to zero, the venture is at a break-even point, which is a full pay-back on the capital investment with no earned interest. As can be seen in FIG. 12, under these assumptions the process would [break-even] *break even* in about 16.5 years and then asymptotically approach a 10% ROR.

Figure 13:
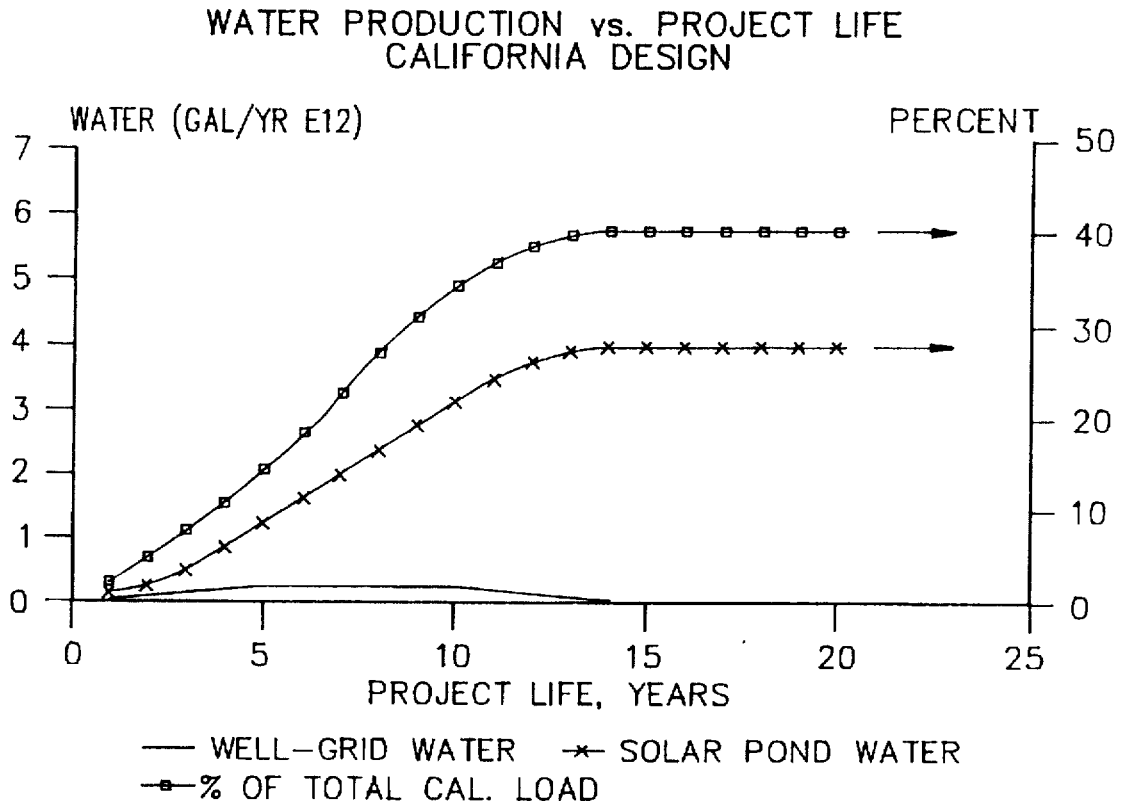
FIG. 13 is a graph comparing the Water Production to Project Life.

The project's impact on California's water situation is shown in FIG. 13. Here, as well as in the economic analysis above, an aggressive developmental schedule is assumed: all 1000 wells are [in-place] *in place* within five years; each of the wells is depleted after 10 years of production, or in other words the well production life is 10 years; and the solar pond/desalination station construction is ongoing in the sense that as soon as any new brine is available, it immediately goes into a solar pond which in turn produces desalinated seawater. The total California water load is based upon the water consumption of 1985. The "Water Production" is based upon the annual gallons produced by the well-grid and the solar ponds. A portion of the water production ends when all of the wells have been depleted. However, the solar pond will continue to produce water indefinitely. The "Percentage of Total California Load" includes industry, agriculture, and personal [used] *use*, and is produced by the combination of the well-grid and the solar pond. A forty percent (40%) figure is realized in about the thirteenth year of the project. The arrows indicate that the production could continue indefinitely.

The means and construction disclosed herein are by way of example and comprise primarily the preferred form of putting the invention into effect. Although the drawings depict a preferred embodiment of the invention, other processes and embodiments have been described within the preceding and following text. One skilled in the art will appreciate that the disclosed processes and devices may have a wide variety of uses, shapes, and configurations. Additionally, persons skilled in the art to which the invention pertains might consider the foregoing teachings in making various modifications, other embodiments, and alternative forms of the invention.

It is, therefore, to be understood that the invention is not limited to the particular processes, embodiments, or specific features shown herein. To the contrary, the inventor claims the invention in all of its forms, including all modifications, equivalents, and alternative embodiments which fall within the legitimate and valid scope of the appended claims, appropriately interpreted under the Doctrine of Equivalents.

INDUSTRIAL APPLICABILITY

The present invention is a combination of any two or more of three integral processes that if used will significantly curtail the water shortage crisis in California, as well as other areas of the United States of [American] *America* and of the world. The disclosed processes accomplish this task in an economically and environmentally sound manner. A first part of the process distills geopressured brine into pure water and saturated saltwater. A second part of the process uses the saturated saltwater to construct solar ponds which, at full production, would produce roughly 40% of California's water load by reverse osmosis. A third part of the process involves the controlled production and disposal from and into near-fault wells for earthquake control and liquid waste disposal.

What is claimed is:

[1. A method of using a geopressured-geothermal reservoir containing a gas-laden fluid, said method comprising the steps of:

(a) drilling a bore into the reservoir;

(b) allowing the fluid within the reservoir to escape through the bore;

(c) passing the fluid into an interior of a turbine such that movement of the fluid causes the turbine to rotate, rotation of the turbine causing a generator to rotate to produce electricity;

(d) passing the fluid from the interior of the turbine to means for separating the gas from the fluid; and (e) passing the fluid into an interior of a multi-effect distillation system, the multi-effect distillation system extracting fresh water from the fluid to produce fresh water and saturated brine.]

2. [The method of claim 1, further comprising the step of] *A method of using a geopressured-geothermal reservoir containing a gas-laden fluid, the reservoir having a bore therein, said method comprising the steps of:*

(*a*) *allowing the fluid within the reservoir to escape through the bore;*

(*b*) *passing the fluid into means for separating the gas from the fluid;*

(*c*) *passing the fluid into an interior of a multi-effect distillation system having cascading distillation effects, each distillation effect removing water vapor from the fluid and passing the water vapor through a heat exchanger located adjacent to fluid contained within a successive distillation effect, the multi-effect distillation system extracting fresh water from the fluid to produce fresh water and concentrated brine; and*

(*d*) withdrawing the fluid from the reservoir in such a manner as to [generate a] *limit intensity of a controlled* earthquake to relieve stress within an underlying geographical strata.

3. [The method of claim 1, further comprising the step of] *A method of using a geopressured-geothermal reservoir containing a gas-laden fluid, the reservoir having a bore therein, said method comprising the steps of:*

(*a*) *allowing the fluid within the reservoir to escape through the bore;*

(*b*) *passing the fluid into means for separating the gas from the fluid;*

(*c*) *passing the fluid into an interior of a multi-effect distillation system having cascading distillation effects, each distillation effect removing water vapor from the fluid and passing the water vapor through a heat exchanger located adjacent to fluid contained within a successive distillation effect, the multi-effect distillation system extracting fresh water from the fluid to produce fresh water and concentrated brine; and*

(*d*) injecting fluid into the reservoir in such a manner as to generate [a] *an* earthquake to relieve stress within an underlying geographical strata.

4. The method of claim 3, wherein said step of injecting fluid into the reservoir comprises the injection and disposal of liquid waste.

5. [The method of claim 1, further comprising the step of] *A method of using a geopressured-geothermal reservoir containing a gas-laden fluid, the reservoir having a bore therein, said method comprising the steps of:*

(*a*) *allowing the fluid within the reservoir to escape through the bore;*

(*b*) *passing the fluid into means for separating the gas from the fluid;*

(*c*) *passing the fluid into an interior of a multi-effect distillation system having cascading distillation effects, each distillation effect removing water vapor from the fluid and passing the water vapor through a heat exchanger located adjacent to fluid contained within a successive distillation effect, the multi-effect distillation system extracting fresh water from the fluid to produce fresh water and concentrated brine; and*

(*d*) passing the gas to means for extracting moisture from the gas.

[6. The method of claim 1, further comprising the step of passing the saturated brine to one or more solar ponds.]

[7. The method of claim 6, wherein said method of passing the saturated brine to one or more solar ponds produces potable water by reverse osmosis desalination of seawater.]

8. The method of claim 4, wherein said method of injecting liquid waste into the reservoir causes the displacement of unprocessed reservoir fluid from the reservoir through the bore.

*9. A method of using a geopressured-geothermal reservoir containing a gas-laden fluid, the reservoir having a bore therein, said method comprising the steps of:*

(*a*) *allowing the fluid within the reservoir to escape through the bore;*

(*b*) *passing the fluid into means for separating the gas from the fluid;*

(*c*) *passing the fluid into an interior of a multi-effect distillation system having cascading distillation effects, each distillation effect removing water vapor from the fluid and passing the water vapor through a heat exchanger located adjacent to fluid contained within a successive distillation effect, the multi-effect distillation system extracting fresh water from the fluid to produce fresh water and concentrated brine; and*

(*d*) *passing the fluid from the bore into an interior of a turbine such that movement of the fluid causes the turbine to rotate, rotation of the turbine causing a generator to rotate to produce electricity.*

*10. The method of claim 9, further comprising the step of passing the fluid from the interior of the turbine to said means for separating the gas from the fluid.*

*11. A method of using a geopressured-geothermal reservoir containing a gas-laden fluid, the reservoir having a bore therein, said method comprising the steps of:*

(*a*) *allowing the fluid within the reservoir to escape through the bore;*

(*b*) *passing the fluid into means for separating the gas from the fluid;*

(*c*) *passing the fluid into an interior of a multi-effect distillation system having cascading distillation effects, each distillation effect removing water vapor from the fluid and passing the water vapor through a heat exchanger located adjacent to fluid contained within a successive distillation effect, the multi-effect distillation system extracting fresh water from the fluid to produce fresh water and concentrated brine; and*

(*d*) *passing steam from the multi-effect distillation system to an external heat exchanger.*

*12. The method of claim 11, further comprising the step of condensing the steam within the external heat exchanger by transferring latent heat to cooling fluid or seawater.*

*13. The method of claim 9, further comprising the step of passing the concentrated brine to one or more solar ponds.*

*14. The method of claim 13, further comprising the step of using the solar ponds to produce power for the desalination of sea water.*

* * * * *